Figure 1:
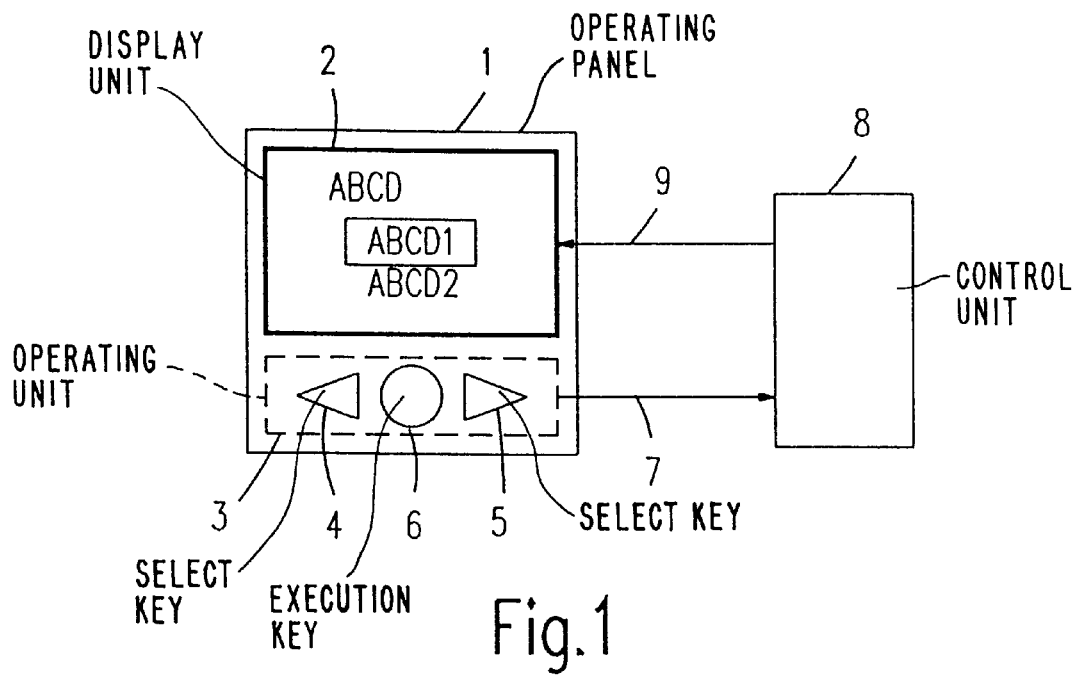

United States Patent
Völkel

Patent Number: 6,104,399
Date of Patent: *Aug. 15, 2000

[54] SYSTEM FOR MENU-DRIVEN INSTRUCTION INPUT

[75] Inventor: Andreas Völkel, Wetzlar, Germany

[73] Assignee: U.S. Philips Corporation, New York, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 09/090,103

[22] Filed: Jun. 3, 1998

[30] Foreign Application Priority Data

Jun. 6, 1997 [DE] Germany ............................ 197 23 815

[51] Int. Cl.$^7$ .................................. G06F 3/00; G06F 3/02
[52] U.S. Cl. ........................ 345/352; 345/146; 345/184; 345/353; 345/354; 345/902
[58] Field of Search ..................................... 345/146, 339, 345/341, 348, 347, 352–354, 902, 156, 184

[56] References Cited

U.S. PATENT DOCUMENTS

| | | | |
|---|---|---|---|
| 5,204,947 | 4/1993 | Bernstein et al. ................... | 345/146 X |
| 5,363,481 | 11/1994 | Tilt ............................................. | 345/352 |
| 5,425,140 | 6/1995 | Bloomfield et al. ..................... | 395/156 |
| 5,627,531 | 5/1997 | Posso et al. .............................. | 345/902 |
| 5,734,853 | 3/1998 | Hendricks et al. ..................... | 345/352 |
| 5,784,583 | 7/1998 | Redpath ................................... | 345/353 |
| 5,877,746 | 3/1999 | Parks et al. ......................... | 345/352 X |
| 5,926,178 | 7/1999 | Kurtenbach .............................. | 345/352 |

FOREIGN PATENT DOCUMENTS

| | | | |
|---|---|---|---|
| 0366132A2 | 5/1990 | European Pat. Off. ........ | B60R 16/02 |
| 0637794A1 | 2/1995 | European Pat. Off. .......... | G06F 1/16 |
| 2319691 | 5/1998 | United Kingdom ............. | H04Q 7/32 |

*Primary Examiner*—Raymond J. Bayerl
*Assistant Examiner*—K. L. Bautista
*Attorney, Agent, or Firm*—Edward W. Goodman

[57] ABSTRACT

A description is given of a system for menu-driven instruction input, comprising a control unit, a display unit which is controlled by the control unit and which serves to display, by means of symbols, at least one instruction-selection list (menu), which includes a number of instructions and/or sub-selection lists (submenus), each submenu including instructions and/or further submenus, and a submenu or an instruction to be carried out or to perform a further selection being selectable from the menu or submenu by a user, and an operating unit connected to the control unit, whereby actuation of said operating unit by the user causes menus, submenus or instructions to be selected and/or executed.

To enable a simple and ergonomically favorable operation, the operating unit comprises two selection keys and an execution key. By means of said selection keys, menus, submenus or instructions can be selected, and the execution key enables a selected instruction to be executed or a selected menu or submenu to be determined, or the selection operation to be ended. The type of function of the execution key is determined by the time that it is operated.

5 Claims, 1 Drawing Sheet

SYSTEM FOR MENU-DRIVEN INSTRUCTION INPUT

DESCRIPTION

The invention relates to a system for menu-driven instruction input, comprising a control unit,
- a display unit which is controlled by the control unit and which serves to display, by means of symbols, at least one instruction-selection list (menu), which includes a number of instructions and/or sub-selection lists (submenus), each submenu including instructions and/or further submenus, and a submenu or an instruction to be carried out or to perform a further selection being selectable from the menu or submenu by a user, and
- an operating unit connected to the control unit, whereby actuation of said operating unit by the user causes menus, submenus or instructions to be selected and/or executed.

U.S. Pat. No. 5,425,140 discloses a computer system and method of operation of said computer system, including a graphical user interface. This graphical user interface comprises a conditional cascading menuing method. The computer system operated by means of said method shields novice users from being overwhelmed by a plurality of advanced operations appearing on the computer display screen. The conditional, cascading feature provides the user with the ability to select a basic function or a basic instruction from a main menu on the display screen. In this case, the default behavior of the function will be performed. By "pressing" a "push-button", which is displayed on the display screen adjacent to the text of each menu item, the user can selectively display a submenu of all forms of function or instruction. The default submenu behavior or item with the submenu is indicated by a check mark adjacent the default item in the submenu. Each time the user selects a submenu item, which is different from the default submenu item, the presently selected submenu item becomes the default menu item or default behavior.

Such a menu control is provided for operation of a "personal computer", which customarily comprises a system processor, a display screen, a keyboard, one or more diskette drives, a fixed disc storage and an optional printer. This computer system may optionally also comprise a mouse as the input device.

The known computer system enables a menu-driven instruction input, which proves to be very advantageous for a plurality of different electronic signal-processing devices, because it also enables the novice user to input complex instructions or perform complex parameter settings. However, for a number of such applications, the use of input devices customarily used for computer systems is too complex in terms of construction and technical handling.

It is an object of the invention to provide a system for menu-driven instruction input, which is simple in construction and can be readily operated by a novice user.

In accordance with the invention, this object is achieved in a system of the type mentioned in the opening paragraph in that the operating unit comprises:
- a first key for selecting, in a given order of representation on the display unit, a menu, submenu or instruction preceding the selected menu, submenu or instruction,
- a second key for selecting, in a given order of representation on the display unit, a menu, submenu or instruction succeeding the selected menu, submenu or instruction,
- an execution key
    - for executing a selected instruction or for determining a selected menu or submenu when the time during which the execution key is operated lies within a first time period, whereby, subsequently, submenus or instructions can be selected from a menu or submenu thus determined, by operating the selection keys, and for ending the selection process without execution of an instruction, when the time during which the execution key is operated lies within a second time period.

Consequently, in the system in accordance with the invention, the menu-driven instruction input is limited to the operation of only 3 keys. Not withstanding this, the system in accordance with the invention is very well adapted to the flexible hierarchical structure of a menu. The operation of the system is easy to learn and ergonomically favorable as it is designed for intuitive handling. The user is given the opportunity to operate the system via said 3 keys without taking his eyes from the display unit. Thus, any menu structure can indeed be operated intuitively.

Alternatively, selection by means of the selection keys can also be controlled in known manner by the duration of operation of the relevant selection key. For example, in the given order of representation on the display unit, it is possible to switch to the directly adjacent menu, submenu or instruction, when the duration of operation of the associated selection key lies within a third time period, and an automatic, rapid advance in said given order may take place when the duration of operation of the associated selection key lies within a fourth time period. Preferably, the third or fourth time period may correspond to the first or second time period.

In an advantageous embodiment of the invention, the execution key is spatially arranged between the selection keys in such a manner that a user can operate all three keys with three adjacent fingers of one hand. By virtue of this arrangement of the keys, it is no longer necessary for the user to repeatedly search the keys to be operated and hence intuitive operation is facilitated as well as the ability to focus his eyes on the display unit. Searching of the keys can be further facilitated in that at least one of the keys is embodied so as to be haptically identifiable. By virtue thereof, the keys can be found without eye contact.

To increase the ease of operation, in terms of improved ergonomics, the operating unit may alternatively be arranged so as to be adjacent, during operation preferably directly below, the display unit.

The system in accordance with the invention can be used in a plurality of electronic-signal processing devices for menu-driven instruction input. A preferred field of application is formed by the operation of radio receivers, in particular, for use in motor vehicles.

These and other aspects of the invention will be apparent from and elucidated with reference to the embodiments described hereinafter.

Figure 2:
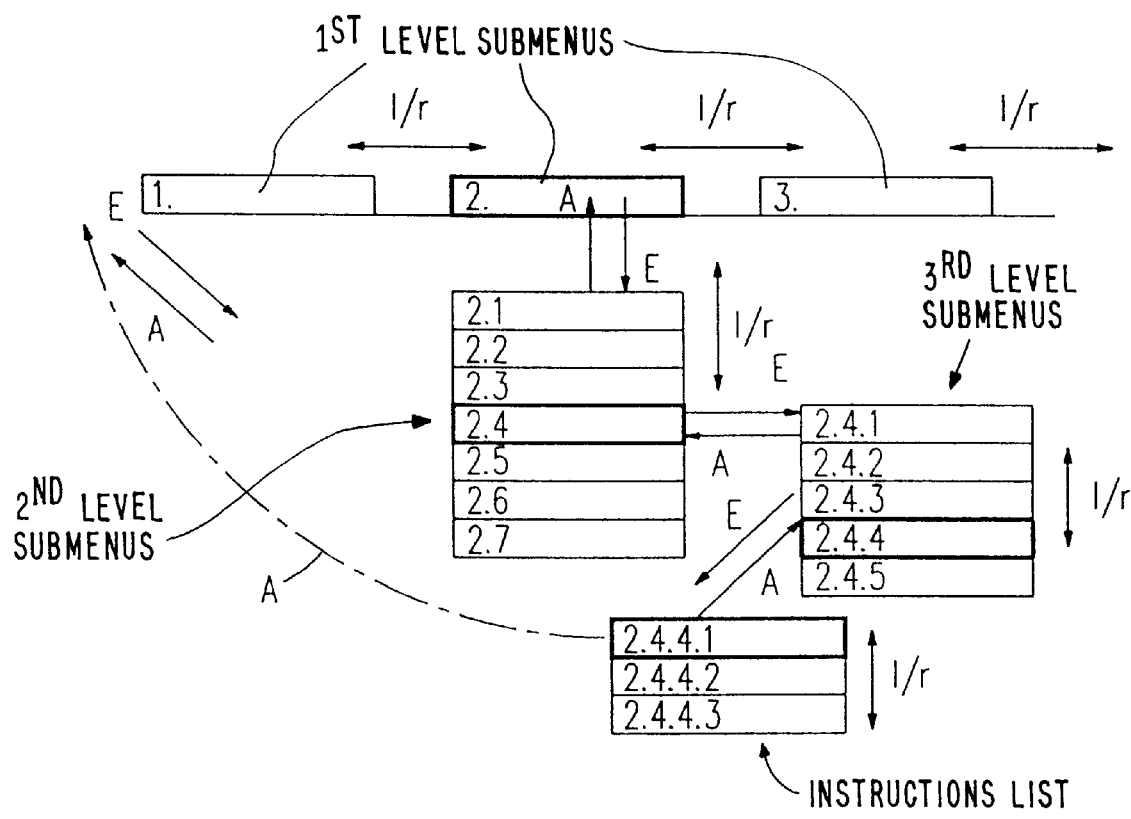

In the drawings:

FIG. 1 is a block diagram of an inventive system for menu-driven instruction input, and FIG. 2 shows an example of a menu structure.

Reference numeral 1 in FIG. 1 denotes a schematically shown exemplary operating panel of a device, the upper and lower parts of which, shown during operation, comprise, respectively, a display unit 2 and an operating unit 3. The operating unit 3 includes a first selection key 4, a second selection key 5 and an execution key 6. The operating unit 3 is connected via a line 7 to a control unit 8, which is connected, via a further line 9, to the display unit 2. At least an instruction-selection list (menu) comprising a number of instructions and/or sub-selection lists (submenus) is stored in the control unit 8. Each submenu contains instructions and/or further submenus, and, from the menu or submenu, a user can select a submenu or an instruction for execution or further selection. The control unit supplies the menus, submenus or instructions in the form of a data signal via the further line 9 to the display unit 2 where they are displayed by means of symbols. The display and execution of the menus, submenus or instructions is controlled by the operating unit 3, that is, by the selection keys 4, 5 and the execution key 6. Instruction signals are transferred from the operating unit 3 to the control unit 8 via the line 7.

FIG. 2 is a coarse schematic representation of an example of a menu structure as processable by the arrangement shown in FIG. 1. FIG. 2 shows a section of an exemplary menu comprising three submenus 1., 2. and 3.. The bold-type frame surrounding the submenu 2. indicates that this submenu has been selected by operating the selection keys 4, 5. For this purpose, the selection keys 4 or 5 are operated so many times that, starting from an initial situation, the submenu 2. is selected. Preferably, this selection is highlighted on the display unit 2, as shown in FIG. 1 by a bold-type frame. By operating the first, i.e. leftmost, selection key 4 of the three keys of the operating unit 3, it is possible to switch from the presently selected submenu to the submenu preceding it in the order displayed, in this case the submenu 1.. By operating the second, i.e. rightmost, selection key 5 of the operating unit 3, it is possible to switch from the selected submenu 2 to the next submenu 3., i.e. said submenu can be selected. Accordingly, in the case of a larger number of submenus, all of said submenus can be selected by operating the selection keys 4, 5. This is represented by means of the double arrows referenced "l/r" in FIG. 2.

In the example shown in FIG. 2, the submenu 2. is chosen to be represented in greater detail. To achieve this, the execution key 6, which is centrally arranged between the selection keys 4, 5 in the operating unit 3, is operated for a length of time which lies within a first time period. For example, the display unit 2 displays the submenu thus selected with all its further submenus 2.1 to 2.7. Preferably, the first further submenu 2.1 is selected simultaneously, so that this is highlighted with preference on the display unit 2. By operating the second selection key 5, the second further submenu 2.2 can be selected. If the second selection key 5 is further operated, the further submenus 2.3 through 2.7 are successively selected. This too is indicated by means of a vertically arranged double arrow "l/r". In the example shown in FIG. 2, the further submenu 2.4 is selected.

If, subsequently, the execution key 6 is operated in the same manner as the first time described above, this results in a further breakdown of the further submenu 2.4 being displayed. In the example shown in FIG. 2, the operations of the execution key 6 are indicated by an arrow referenced "E". In the menu structure, a set of further submenus 2.4.1 through 2.4.5 subordinate to the further submenu 2.4 is reached, from which set of further submenus one can be selected, by operating the selection keys 4, 5, and broken down further.

The last-mentioned breakdown step, which is also carried out by means of the execution key 6 and also indicated by means of an arrow referenced "E", leads to a list of instructions 2.4.4.1 through 2.4.4.3 of which, in this example, the first instruction 2.4.4.1 is selected. If the execution key 6 is operated again in the above-described manner, the instruction selected in the manner described hereinabove is executed.

It is possible to return from every position within the menu structure displayed to its starting point, namely also by operating the execution key 6, however, for a time which lies within a second time period. While the first-mentioned operation of the execution key 6 can be referred to as an input operation, the last-described operation can be referred as an abortion operation. As a result of such abortion, either the next higher submenu or menu in the menu structure is reached or, optionally, the starting point of the entire menu or of all available menus is reached without intermediate steps. In FIG. 2, this means that such an abortion, symbolically indicated as arrow "A", leads, for example, to a return from instruction 2.4.4.1 to submenu 2.4.4. A subsequent abortion then leads to the submenu 2.4, a third abortion finally leads to the submenu 2.1 in the "top plane" of the menu structure displayed. Alternatively, the control unit 8 can be embodied so that a single abortion at any point in the menu structure causes, in principle, a direct return to the starting point of all available menus. Such an abortion, indicated in FIG. 2 by means of a dash-dot line, would have the same destination in the menu structure as the abortion shown next to the submenu 1.

In such a menu structure, separate "abortion" menu items are no longer required. Instead, the "abortion" function can be performed from any position in the menu or submenu. As a result, also a "search" for the outcome "of the instruction input" is superfluous.

At every position in the menu structure a clear distinction can be made between "scrolling" the menu or the submenu and the actual choosing, that is, the eventual execution of the selected instruction. If the instruction input in accordance with the invention is used for setting parameters of an electronic device, it is thus possible to make a selection from all possible parameters, without actually setting or changing a parameter, before an actual change of a setting of the electronic device is performed.

The keys 4, 5, 6 are preferably operated by, respectively, the forefinger, middle finger and ring finger, and are shaped accordingly. The forefinger and ring finger operating the selection keys 4, 5, respectively, are used to select the menu items, submenu items and hence, for example, parameters and parameter values. The middle finger operating the execution key 6 is used, dependent upon the duration of operation, to perform a selection or storage of a value, a parameter, a menu item or an instruction, or, as a result of abortion, a submenu or a menu is abandoned without selecting (i.e. choosing) or storing the value or instruction displayed last, or without changing a parameter. For example, for an input operation, the execution key 6 is pressed down for more than a half second, while, for an abortion operation, the execution key 6 is pressed down for less than a half second.

What is claimed is:

1. A system for menu-driven instruction input, comprising:

a control unit;

a display unit controlled by the control unit, said display unit displaying, by means of symbols, at least one instruction-selection list (menu), which includes a number of instructions and/or sub-selection lists (submenus), each submenu including instructions and/ or further submenus, and a submenu or an instruction to be carried out or to perform a further selection being selectable from the menu or submenu by a user; and an operating unit connected to the control unit, whereby actuation of said operating unit by the user causes menus, submenus or instructions to be selected and/or executed, characterized in that the operating unit comprises:

a first key for selecting, in a given order of representation on the display unit, a menu, submenu or instruction preceding a currently selected menu, submenu or instruction;

a second key for selecting, in a given order of representation on the display unit, a menu, submenu or instruction succeeding the currently selected menu, submenu or instruction; and an execution key for (1) executing a selected instruction or for determining a selected menu or submenu by the user operating the execution key for a first time period, whereby, subsequently, submenus or instructions are selected from a menu or submenu thus determined, by operating the first and second selection keys, and for (2) ending the selection process without execution of an instruction, by the user operating the execution key for a second time period.

2. The system as claimed in claim 1, characterized in that the execution key is spatially arranged between the first and second selection keys in such a manner that a user is able to operate all three keys with three adjacent fingers of one hand.

3. The system as claimed in claim 1, characterized in that at least one of the keys is structured to be haptically identifiable.

4. The system as claimed in claim 1, characterized in that the operating unit is arranged adjacent, during operation, the display unit.

5. An electronic signal-processing device, wherein said electronic signal-processing device includes a system for menu-driven instruction input comprising:

a control unit;

a display unit controlled by the control unit, said display unit displaying, by means of symbols, at least one instruction-selection list (menu), which includes a number of instructions and/or sub-selection lists (submenus), each submenu including instructions and/or further submenus, and a submenu or an instruction to be carried out or to perform a further selection being selectable from the menu or submenu by a user; and an operating unit connected to the control unit, whereby actuation of said operating unit by the user causes menus, submenus or instructions to be selected and/or executed, characterized in that the operating unit comprises:

a first key for selecting, in a given order of representation on the display unit, a menu, submenu or instruction preceding a currently selected menu, submenu or instruction;

a second key for selecting, in a given order of representation on the display unit, a menu, submenu or instruction succeeding the currently selected menu, submenu or instruction; and an execution key for (1) executing a selected instruction or for determining a selected menu or submenu by the user operating the execution key for a first time period, whereby, subsequently, submenus or instructions are selected from a menu or submenu thus determined, by operating the first and second selection keys, and for (2) ending the selection process without execution of an instruction, by the user operating the execution key for a second time period.

* * * * *